——————— PEANUT BUTTER AND DEFATTED WHEAT GERM
— — — — — — — PEANUT BUTTER (CONTROL)
TASTE
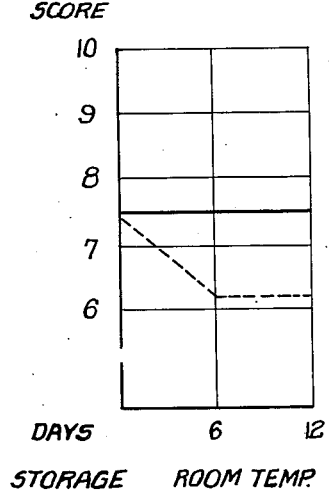
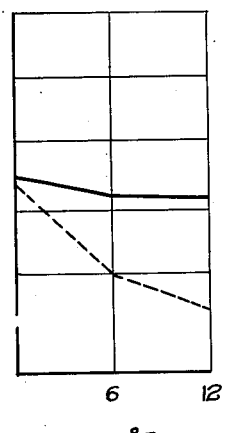
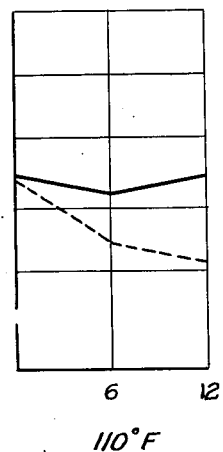
TEXTURE
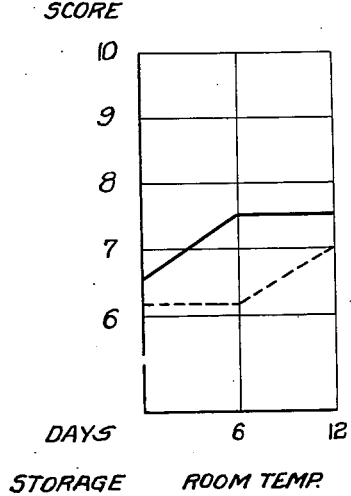
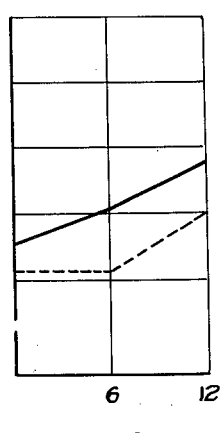
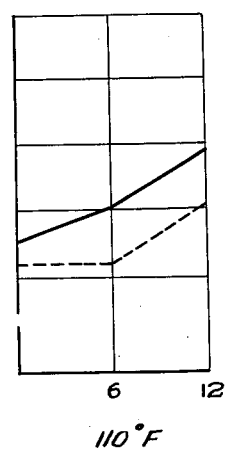

United States Patent Office 3,037,865
Patented June 5, 1962

3,037,865
PEANUT BUTTER PRODUCT AND PROCESS OF
MAKING THE SAME
Kazimir K. Lilien, Elmhurst, and Elmer F. Glabe, Chicago, Ill., assignors to National Bakers Services, Chicago, Ill., a corporation of Illinois
Filed July 5, 1960, Ser. No. 40,614
3 Claims. (Cl. 99—128)

This invention relates to peanut butter and particularly to a peanut butter product having enhanced palatability, especially taste, flavor, and texture.

In the manufacture of peanut butter, peanuts or groundnuts are first removed from the outer shells, then separated from the inner hulls. These peanut kernels are then commonly roasted under conditions of closely controlled heat and moisture removal. The roasted peanuts are then ground in a Carborundum mill or other suitable grinding mechanism, being thereby completely reduced to a paste. This paste product is commonly known as peanut butter.

This peanut butter resulting from ground, roasted peanuts, is not stable with respect to the oil and proteinaceous material. On standing, peanut butter very quickly separates into a relatively dense proteinaceous material with a clear layer of peanut oil collecting on top of the latter. The separation is progressive. The first separation of oil can be noticed in as short a time as a few hours after grinding. In some instances, depending upon variety of peanuts, the degree of roast and other factors, the separation will be noticed very quickly. Over a period of several days and progressing to 3 to 4 weeks, the separation of the oil into a distinct layer will often be as much as 60% to 75% complete.

Although not all consumers object to this separation, before the peanut butter is eaten it must be again stirred or rendered homogeneous by the user. Since this is not easily done in a normal container, the separation generally results in a progressively poor product from the standpoint of texture and spreadability for the user.

In order to prevent separation hydrogenated peanut oil is frequently added immediately after the peanuts are ground with thorough mixing. The hydrogenated peanut oil has a melting point of approximately 130° F. Upon cooling, this sets into a rather firm-consistency matrix which entraps the peanut butter, thereby resulting in a stabilized peanut butter which does not separate into a proteinaceous or a mealy layer and an oil layer. Hardened fats and oils of several sources other than peanuts are sometimes employed. In each case, however, the additive fats are hydrogenated having a very high melting point.

This presents somewhat of an objection to many users in view of the cholesterol-produced tendencies of highly hydrogenated fats in the human body, with resulting depositions of cholesterol in the blood vessels.

By using the teachings of the present invention, it is possible to reduce the oil separation tendencies of peanut butter without the addition of highly hydrogenated fats. In fact, the invention teaches the addition of a virtually fat free substance from which the native oil has been extracted. This extraction renders the substance susceptible to other oil absorption. This has the effect of preserving some homogeneity of the peanut butter with the resultant improvement in texture and spreadability for the user.

Another important object of this invention is to provide a peanut butter which has less of the objectionable cloying characteristic in the mouth. Some peanut butters, in fact most of them, have an undesirable tendency to adhere to the roof of the mouth, thereby producing unfavorable effects for the user. This patent teaches the addition of a substance which reduces this cloying effect of peanut butter.

Still another object of this invention is to provide a peanut butter with a much improved taste. Prior to this invention the addition of sodium chloride in the amounts of approximately 0.9 to 1.5% has been commonly made. The sodium chloride enhances the taste of peanut butter without question. However, a considerable number of consumers live on diets in which the intake of sodium chloride is strictly limited for biological reasons. The present invention provides peanut butter which has an enhanced flavor without the addition of any sodium chloride whatsoever.

A still further object is to provide an improved peanut butter product in which the texture has been modified by specific chemical reactions which take place between the peanut butter and the added material.

Other objectives and advantages of this invention will become apparent from a consideration of the following description and examples.

The new peanut butter product is made by mixing controlled quantities of specially defatted wheat germ with peanut butter. Wheat germ is the vital portion of the wheat berry. It is the seat of the embryo and contains a high quantity of protein, oil, and enzymatic factors of the wheat berry. The modern flour mill process completely removes this wheat germ from patent flour. It is easily collected. It is defatted by solvent extraction processes known to the industry. The resulting defatted material has a desirable sweetish taste; it is high in protein. The extraction of the oil from the cellular material results in a product which has an affinity for vegetable oils. In the present invention it appears that mixing the defatted wheat germ with peanut butter provides an absorbent material for the oil which separates from the mealy fraction of peanut butter. By an intimate mixture of the two products the wheat germ stabilizes the peanut butter, drastically reducing the tendency for oil separation to take place.

In addition to these features the taste producing effects of wheat germ on peanut butter are marked. They are not merely the result of mixing these two compositions, but they truly result from a chemical reaction between the two which we will describe herein.

Wheat germ from the mill contains approximately 10 to 12% by weight of oil and is normally collected from the wheat milling process in the form of flakes. The defatted wheat germ after the solvent extraction process usually has a fat content less than 2%, preferably less than 1%, and most desirably less than 0.5% by weight. The defatted wheat germ may be ground to a particle size to pass a 60 U.S. mesh screen.

For the purpose of describing the effects produced upon peanut butter by this invention, the following analytical data are provided. It is understood that in an attempt to explain the apparent results of the combination of peanut butter with the substances taught by this patent, that the inventor is not limited to the scope of the explanation since there may be other reactions, although not clear at this point, that may very well be taking place.

TABLE I

*Proximate Analysis of Roasted Peanut Kernels (Peanut Butter)*

[U.S.D.A. Agriculture Handbook No. 8 "Composition of Foods" p. 37]

| | Percent |
|---|---|
| Moisture | 2.60 |
| Protein | 26.90 |
| Fat | 44.20 |
| Ash | 2.70 |
| Fiber | 2.40 |
| Carbohydrate | 21.20 |
| | 100.00 |

The composition of defatted wheat germ is shown in Table II.

TABLE II

*Proximate Composition of Defatted Wheat Germ*

| | Percent |
|---|---|
| Moisture | 6.60 |
| Protein | 34.75 |
| Fat | .23 |
| Ash | 4.91 |
| Fiber | 1.01 |
| Carbohydrate | 52.50 |
| | 100.00 |

Wheat germ originally contains approximately 10 to 12% of oil and is normally collected from the wheat milling process as flakes. After being defatted it is ground to a fineness approaching that of coarse flour.

According to the present invention, this defatted wheat germ may be incorporated with peanut butter at various levels to provide varying degrees of taste and texture differences. The complete range of the amount of wheat germ will be described herein.

In general, the defatted wheat germ should be incorporated in the peanut butter in amounts sufficient to noticeably improve the taste, usually from about 1% to about 12% by weight of the peanut butter.

One particular level as shown in the following example provides a particularly good tasting and palatable product.

EXAMPLE #1

| | Percent |
|---|---|
| Ground roasted peanuts (freshly made) | 97.0 |
| Defatted wheat germ | 3.0 |
| | 100.0 |

This mixture when first made, does not appear to be substantially different than the ground roasted peanut paste. This was proved by submitting these two samples to a panel of four expert judges who examined the products for taste and texture differences. The tests were made on a "blind basis" wherein none of the judges were aware of the identity of any of the samples. The panel was required to score the samples for taste and texture assigning a numerical value within the scale where 10 would be an excellent taste and texture, and 1 would be a very poor taste or texture. The results of this taste panel score using averages for the four judges are as follows.

TABLE III

*Panel Organoleptic Score [1] Immediately After Preparation*

| Sample | Taste | Texture |
|---|---|---|
| Ground Roasted Peanut (Butter) Control | 7.4 | 6.2 |
| Ground Roasted Peanut (Butter) plus 3% Wheat Germ | 7.5 | 6.5 |

[1] Average of 4 individual scores.

Portions of the wheat germ-ground roasted peanuts (freshly made) were stored in closed glass jars at room temperature, 45° F., and 110° F. Samples of ground roasted peanut paste (freshly made) without wheat germ were also stored at these same temperatures. At the end of 6 days and again at the end of 12 days, samples of each of these compositions were submitted to the taste panel under code numbers. The results are shown in Tables IV and V. The data are also graphically illustrated in the accompanying drawing attached hereto.

TABLE IV

*Panel Organoleptic Score [1] After 6 Days' Storage*

| Sample | Taste | Texture | Comment |
|---|---|---|---|
| Room Temp.—Control | 6.2 | 6.2 | Gummy; Sticky. |
| Room Temp.—Wheat Germ | 7.5 | 7.5 | Soft. |
| 45° F.—Control | 6.0 | 6.2 | Sl. Stiff. |
| 45° F.—Wheat Germ | 7.2 | 7.2 | Soft. |
| 110° F.—Control | 6.5 | 6.2 | Stiff. |
| 110° F.—Wheat Germ | 7.2 | 7.0 | Soft. |

[1] Average of 4 individual scores.

TABLE V

*Panel Organoleptic Score [1] After 12 Days' Storage*

| Sample | Taste | Texture |
|---|---|---|
| Room Temp.—Control | 6.2 | 7.0 |
| Room Temp.—Wheat Germ | 7.0 | 7.5 |
| 45° F.—Control | 5.5 | 7.0 |
| 45° F.—Wheat Germ | 7.2 | 7.8 |
| 110° F.—Control | 6.2 | 7.2 |
| 110° F.—Wheat Germ | 7.5 | 7.8 |

[1] Average of 4 individual scores.

An examination of the data in Tables III, IV and V as given in the accompanying drawing indicate that the panel of expert tasters was unable to tell any great difference between the control peanut butter and that made with 3% wheat germ when the two were freshly made. However, a definite difference in both taste and texture were detectable by the panel after 6 days' and after 12 days' storage. The conditions of storage definitely are factors, however, the wheat germ product at any storage temperature shows an improved taste over the original taste score when the product was freshly made. The best results were obtained either at room temperature or at 110° F. At 45° F. the taste of the wheat germ product was better than the control but slightly inferior to that obtained at room temperature and 110° F. storage, at 6 days.

Slight texture differences at the outset were detectable by the panel. These differences between the two samples became greater over the 12 day storage period.

These tests were repeated, the results being substantially the same as the data presented.

The panel taste tests indicate that a reaction is taking place. The following data are presented as partial evidence of at least one reaction which gives rise to the taste and texture differences which the expert panel is able to detect.

Tables VI and VII give the amino acid analyses for both peanut kernel and for wheat germ. It is to be noted that it is more than coincidence that the amino acid balance, that is the ratio of the various amino acids in the proteins of these two components, are with few exceptions very nearly the same. In both cases it is important to note that glutamic acid is the principal amino acid. Furthermore, this is present in large quantity in comparison to any one of the other amino acids.

TABLE VI

*Principal Amino Acids in Peanut Kernel Composition of Edible Peanuts*

[C. Hoffbaur, U.S.D.A. Ag. Res. Service, Southern Regional Laboratory, AIC-370, March, 1954]

|  | Percent of Total Protein | Grams per 100 g. Peanut (Percent)[1] |
| --- | --- | --- |
| Glutamic Acid | 19.2 | 5.14 |
| Arginine | 10.6 | 2.75 |
| Leucine | 7.0 | 1.88 |
| Tyrosine | 4.4 | 1.18 |
| Valine | 8.0 | 2.12 |
| Phenylalanine | 5.4 | 1.45 |
| Isoleucine | 4.3 | 1.15 |
| Lysine | 3.4 | .92 |
| Threonine | 2.9 | .78 |
| Histidine | 2.1 | .56 |
| Tryptophan | 2.0 | .54 |
| Methionine | 1.2 | .32 |
| Cystine | 1.1 | .29 |

[1] Calculation based on 26.90% protein at 2.60% moisture.

TABLE VII

*Principal Amino Acids in Wheat Germ*

[Block and Bolling, "Amino Acid Composition of Proteins and Foods," Second Edition, 1951]

|  | Grams per 100 grams of germ (percent) |
| --- | --- |
| Glutamic acid | 4.50 |
| Arginine | 2.70 |
| Leucine | 2.39 |
| Tyrosine | 2.00 |
| Valine | 1.77 |
| Phenylalanine | 1.60 |
| Isoleucine | 1.40 |
| Lysine | 1.90 |
| Threonine | 1.47 |
| Histidine | 1.00 |
| Tryptophan | 0.43 |
| Methionine | 0.53 |
| Cystine | 0.40 |

It is well known that wheat germ contains a very active enzymatic system of diastatic, proteolytic and lipolytic enzymes. The proteolytic factors are very active both upon the native protein of the wheat germ as well as upon other vegetable proteins. We have demonstrated as the additional data will show, that the proteolytic enzyme of the wheat germ does react with the protein of the peanut kernel. The usual result occurs, that is, the protein is split into its individual amino acids. This splitting, although not complete, is sufficient to produce enough of the individual amino acids to result in a definite change in taste. A plausible explanation for this change in taste is the reason that vegetable proteins which have been split into their individual amino acids, are well known flavoring compositions which have been used in food products for many years. The best example of this is the product known as soy sauce, which is a soybean protein which has been split into its individual amino acids. In the latter case sodium carbonate or sodium hydroxide is added to partially neutralize the amino acids and to make the corresponding salt. Sodium glutamate is prepared in its pure form and is well known as a flavor accenting factor for many food products.

Tables VIII and IX show the principal mineral elements in peanut kernels and wheat germ.

TABLE VIII

*Principal Mineral Elements in Peanut Kernel*

|  | Percent |
| --- | --- |
| Phosphorus | 0.4300 |
| Potassium | 0.7900 |
| Magnesium | 0.2100 |
| Calcium | 0.0290 |

TABLE IX

*Principal Mineral Elements in Defatted Wheat Germ*

|  | Percent |
| --- | --- |
| Phosphorus | 1.1700 |
| Potassium | 1.0400 |
| Magnesium | .3500 |
| Calcium | .0640 |
| Manganese | .0078 |

It is important to note that the element potassium occurs in large quantity in both products. It is quite possible that the splitting of the proteinaceous material by the proteolytic enzyme of the wheat germ releases enough potassium to react with some of the amino acids, perhaps glutamic, to produce, in situ, a substantial quantity of amino acid salts which reflect on the taste of the peanut butter which contains wheat germ.

Other examples of this new peanut butter composition are as follows:

EXAMPLE 2

|  | Percent |
| --- | --- |
| Ground roasted peanuts | 99.0 |
| Defatted wheat germ | 1.0 |
|  | 100.0 |

EXAMPLE 3

|  | Percent |
| --- | --- |
| Ground roasted peanuts | 94.0 |
| Defatted wheat germ | 6.0 |
|  | 100.0 |

EXAMPLE 4

|  | Percent |
| --- | --- |
| Ground roasted peanuts | 88.0 |
| Defatted wheat germ | 12.0 |
|  | 100.0 |

In Example #2 the effect on taste and texture of the wheat germ is discernible although less than that found in Example #1.

Peanut butters of the composition shown for Examples #3 and #4 exhibit the difference in taste and texture. Differences in viscosity or body and stability of the peanut butter are very evident for the composition of Examples 1 through 4. At the lower levels of wheat germ the viscosity and body are not what might be expected from the addition of a dry powdered substance to peanut butter. It would be anticipated that the body would be stiffened and that stability would be reduced. The compositions as described under Examples 1, 2, and 3 show a smoother consistency which spreads more easily than the peanut butter without the wheat germ. The material in Example 4 has a much stiffer body showing that the dry-material-effect makes itself felt since the composition is visibly more stiff. Taste is enhanced however.

In order to determine the extent of the action of the proteolytic enzyme on the peanut butter, samples of the various peanut butters were subjected to a determination for amino nitrogen according to the method described in Cereal Laboratory Methods, the official method book of the American Association of Cereal Chemists, Sixth Edition, 1957. The amino nitrogen was calculated as grams per kilogram of peanut butter. The following Table X gives the values obtained and shows that the proteolytic enzyme of the wheat germ is active in reducing some of the peanut protein nitrogen to free amino acid nitrogen.

TABLE X

*Amino Nitrogen in Peanut Butter*

| Sample | Amino Nitrogen | |
|---|---|---|
| | Initial, g./kg. | After 5 Days, g./kg. |
| Room Temp.—Control | 1.4 | 2.1 |
| Room Temp.—3% Wheat Germ | 1.4 | 4.2 |
| Room Temp.—6% Wheat Germ | 1.4 | 4.2 |
| Room Temp.—12% Wheat Germ | 1.4 | 3.5 |

The amino acid nitrogen increases are significant.

Other modes of applying the principle of the invention may be employed, change being made as regards the details described, provided the features stated in any of the following claims or the equivalent of such be employed.

We, therefore, particularly point out and distinctly claim as our invention:

We claim:

1. A new food product comprising in admixture peanut butter and at least about 1% by weight of defatted wheat germ.

2. A food composition of improved taste and texture comprising peanut butter and from about 1% to about 12% by weight of defatted wheat germ.

3. The process for improving the taste and texture of peanut butter which comprises admixing from about 1% to about 12% by weight of defatted wheat germ therewith, and storing said mixture for a period of time sufficient to allow detectable increases in amino nitrogen.

References Cited in the file of this patent

UNITED STATES PATENTS

| 1,696,766 | Howe | Dec. 25, 1928 |
| 2,236,517 | Cahn et al. | Apr. 1, 1941 |

OTHER REFERENCES

"Continuous Enrichment of Peanut Butter With Vitamin A," by Willich et al., reprinted from Food Engineering, August 1954, pp. 129, 131, 166. Copyright 1954 by McGraw-Hill Pub. Co. Inc., New York 36, N.Y.

"Vitamin Potency of Wheat Embryo (Germ), prepared by the Technical Research Department of General Mills, Inc., Minneapolis, Minnesota, pp. 6–15. Received in Patent Office on May 1, 1935.